(12) United States Patent
Palmer et al.

(10) Patent No.: US 11,444,513 B2
(45) Date of Patent: Sep. 13, 2022

(54) MOTOR CONTROLLER CAN WITH SYNTHETIC HOUSING AND METAL HEAT SINK

(71) Applicant: Nidec Motor Corporation, St. Louis, MO (US)

(72) Inventors: Steven R. Palmer, Highland, IL (US); Richard L. Eason, Ballwin, MO (US)

(73) Assignee: Nidec Motor Corporation, St. Louis, MO (US)

( * ) Notice: Subject to any disclaimer, the term of this patent is extended or adjusted under 35 U.S.C. 154(b) by 188 days.

(21) Appl. No.: 16/925,510

(22) Filed: Jul. 10, 2020

(65) Prior Publication Data
US 2020/0343792 A1 Oct. 29, 2020

Related U.S. Application Data

(63) Continuation-in-part of application No. 15/891,010, filed on Feb. 7, 2018, now Pat. No. 10,715,010.

(60) Provisional application No. 62/456,005, filed on Feb. 7, 2017.

(51) Int. Cl.
| | |
|---|---|
| *H02K 5/08* | (2006.01) |
| *H02K 11/02* | (2016.01) |
| *H02K 5/15* | (2006.01) |
| *H02K 5/18* | (2006.01) |
| *H02K 11/33* | (2016.01) |
| *H02K 11/40* | (2016.01) |
| *H02K 9/22* | (2006.01) |

(52) U.S. Cl.
CPC .............. *H02K 11/02* (2013.01); *H02K 5/15* (2013.01); *H02K 5/18* (2013.01); *H02K 9/22* (2013.01); *H02K 11/33* (2016.01); *H02K 11/40* (2016.01); *H02K 2211/03* (2013.01)

(58) Field of Classification Search
CPC ............ H02K 5/08; H02K 5/18; H02K 9/227; H02K 9/22
See application file for complete search history.

(56) References Cited

U.S. PATENT DOCUMENTS

| | | | |
|---|---|---|---|
| 6,198,183 B1 * | 3/2001 | Baeumel | H02K 5/20 310/52 |
| 7,474,024 B2 * | 1/2009 | Nakanishi | F04D 13/064 310/71 |
| 10,715,010 B2 * | 7/2020 | Palmer | H02K 11/33 |

* cited by examiner

*Primary Examiner* — Dang D Le
(74) *Attorney, Agent, or Firm* — Hovey Williams LLP

(57) ABSTRACT

An electric motor including a rotor, a stator, a motor housing having a controller can, and a controller having an electronic component disposed within the controller can. The controller can includes an insert comprising thermally conductive metal for exchanging heat with an external heat sink space.

20 Claims, 16 Drawing Sheets

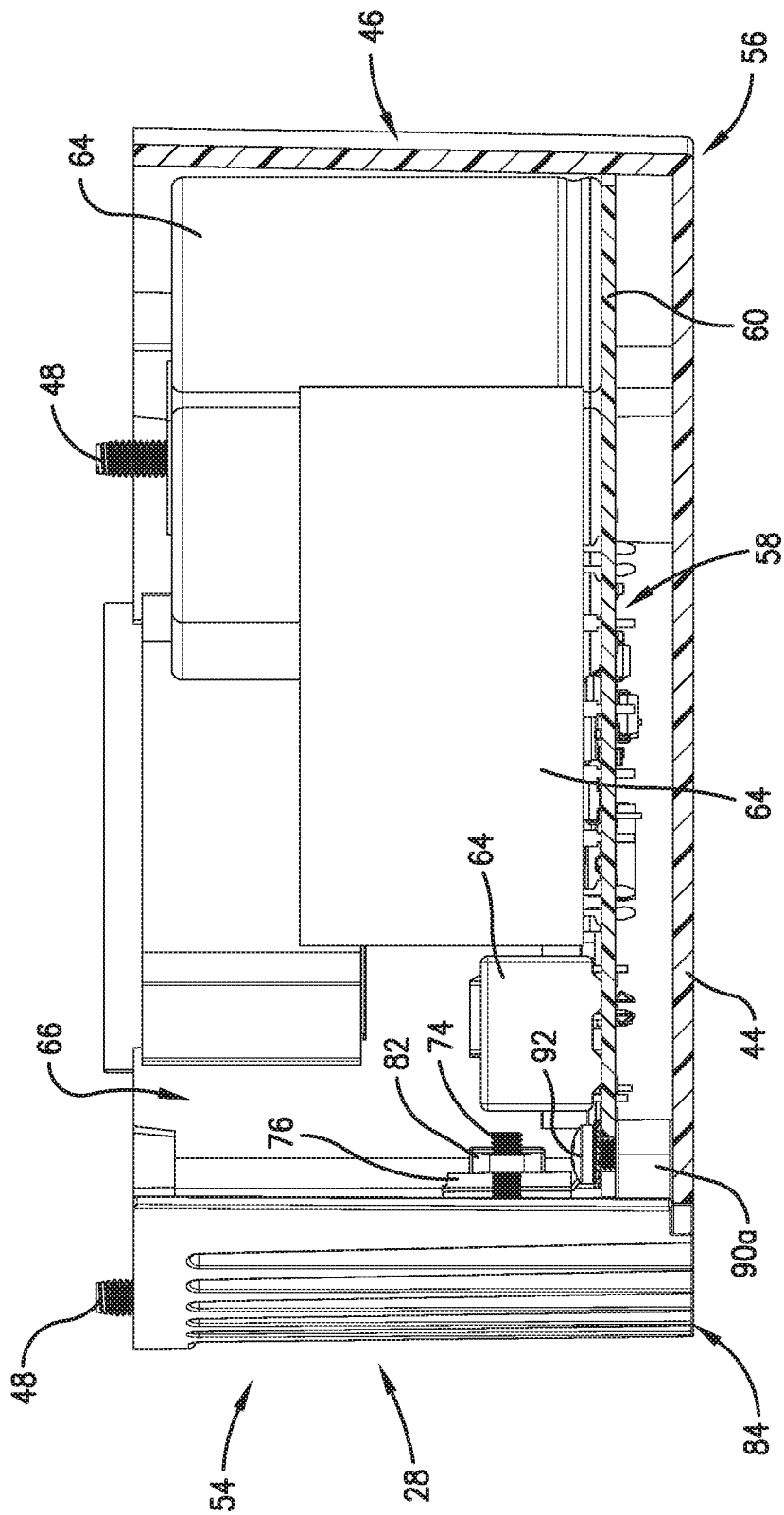

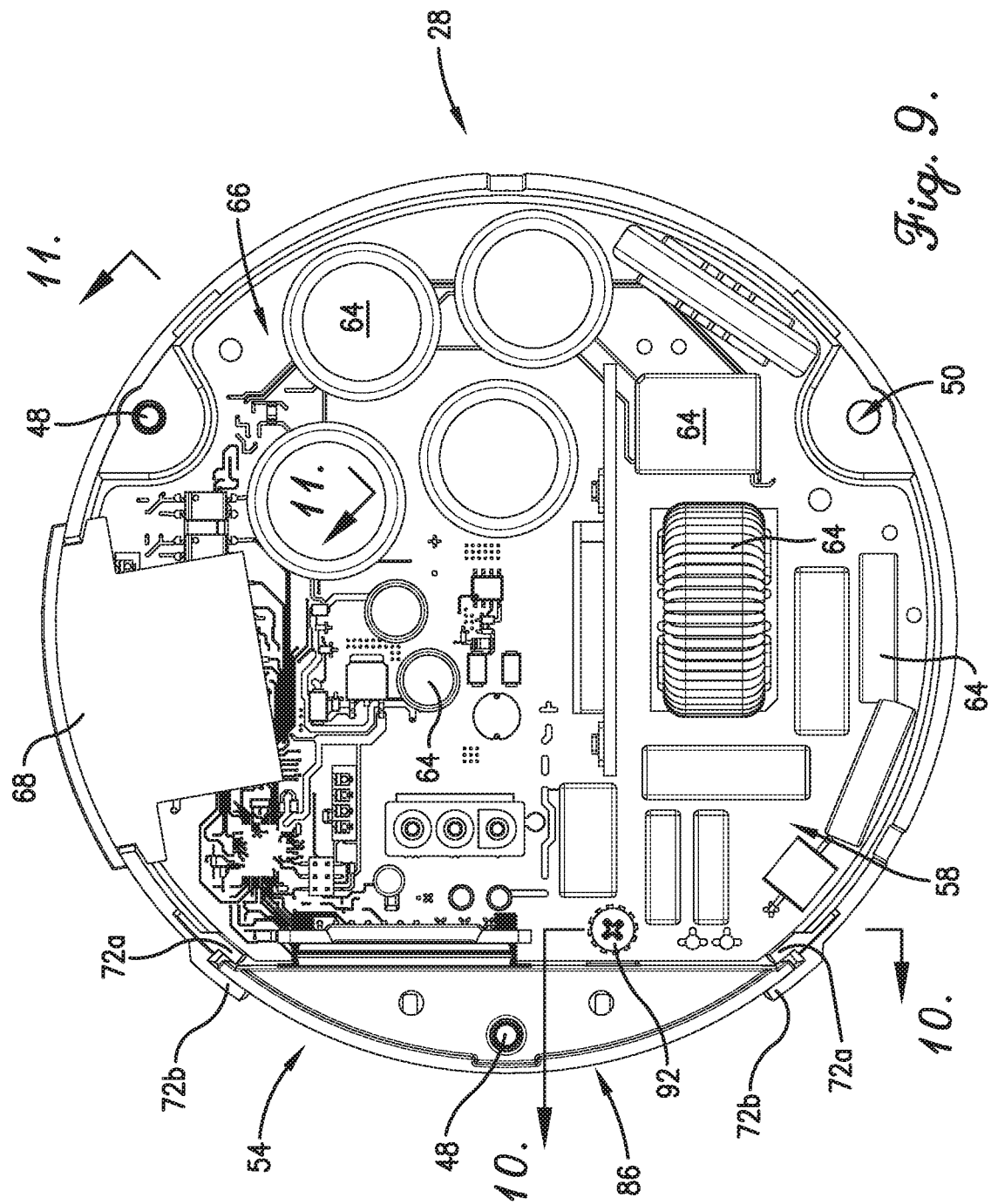

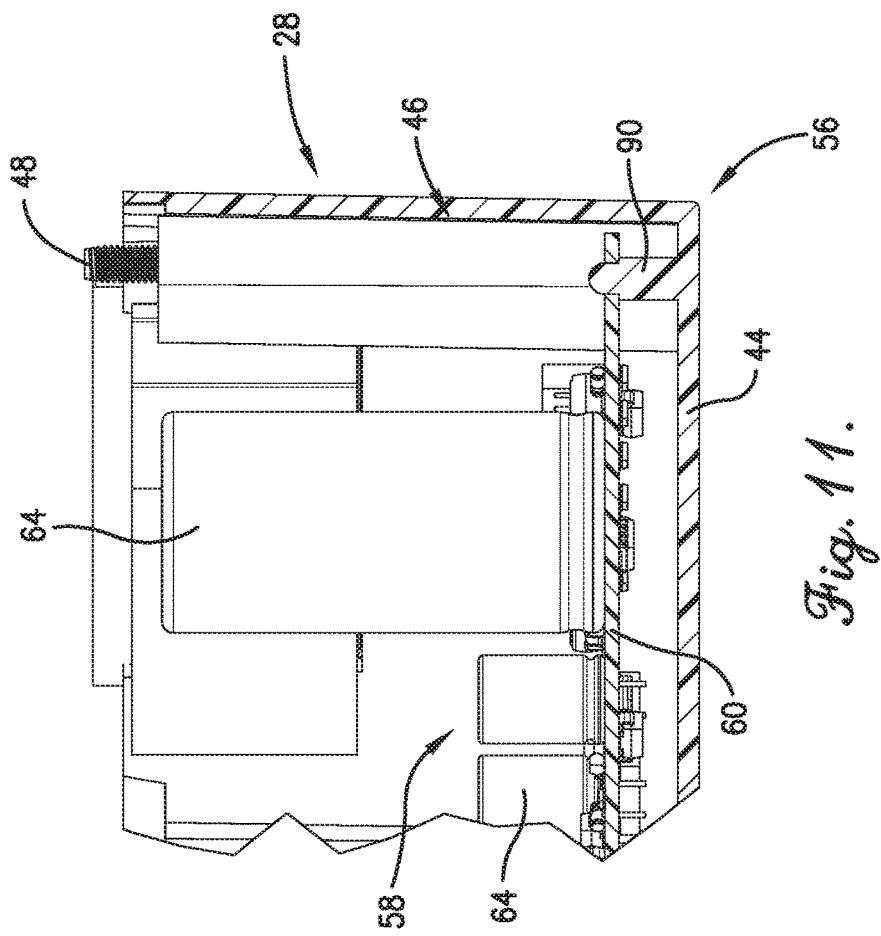
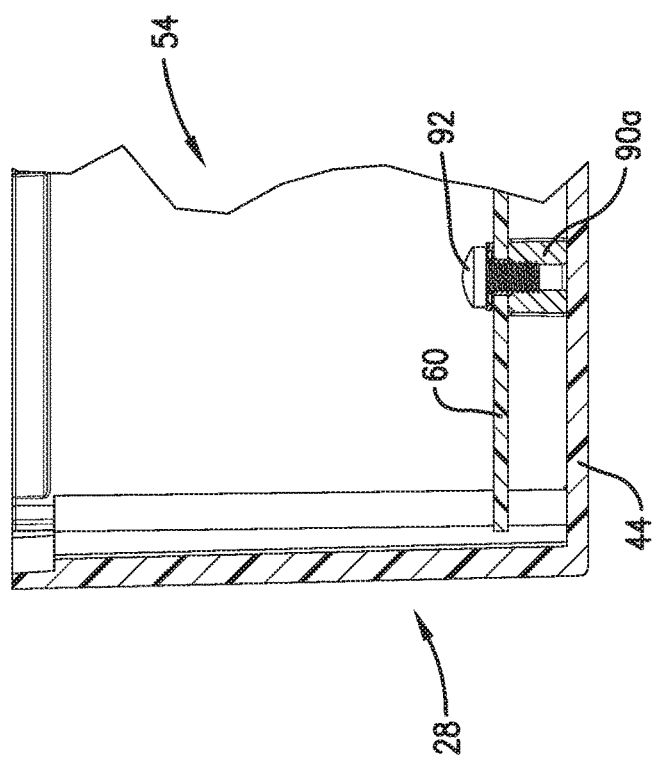

MOTOR CONTROLLER CAN WITH SYNTHETIC HOUSING AND METAL HEAT SINK

CROSS-REFERENCE TO RELATED APPLICATION

The present application is a continuation-in-part of identically-titled U.S. patent application Ser. No. 15/891,010, filed Feb. 7, 2018, which itself claims the benefit of and priority from identically-titled U.S. Provisional Patent Application Ser. No. 62/456,005, filed Feb. 7, 2017, and the entire disclosure of each of these applications is hereby incorporated by reference herein.

BACKGROUND OF THE INVENTION

Field of the Invention

The present invention relates generally to an electric motor. More particularly, the present invention relates generally to an electric motor having a controller can that includes a metal heat sink insert and houses at least one electronic component.

Discussion of the Related Art

Electric motors are conventionally used in applications including but not limited to heating, ventilation, and air conditioning (HVAC) systems; pumps; and home appliances. Such a motor may include electronic components comprising a controller for controlling at least some operations of the motor. The controller may be housed in a controller can defining a controller compartment. Operation of the controller generates thermal heat as well as conductive and radiated electromagnetic interference (EMI).

Conventional methods for dispelling thermal heat from the controller compartment may include forming openings and/or fins in the can. Moreover, conventional approaches to addressing unwanted EMI include component-based suppression (for example, common-mode choke(s), ceramic capacitor(s) between motor terminals, intervening complex filters between components comprising inductors, capacitor and/or varistors). It is also known that connecting one or more component(s) to a ground wire may provide some improvement in EMI emissions.

SUMMARY

According to one aspect of the present invention, an electric motor is provided for improved heat exchange. The motor includes a rotor, a stator, a motor housing including a controller can, and a controller including an electronic component. The electronic component is disposed within the controller can. The controller can includes a metal insert thermally connected to the electronic component.

According to another aspect of the present invention, an electric motor is provided for improved heat exchange. The motor includes a rotor, a stator, and a motor housing including a controller can. The controller can has an end plate and a metal insert extending substantially transversely from the end plate. The metal insert comprises thermally conductive material. The end plate comprises a thermally insulative material having a thermal conductivity at least four (4) times less than that of the thermally conductive material.

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

Preferred embodiments of the present invention are described in detail below with reference to the attached drawing figures, wherein:

FIG. 8 is a partially-sectioned side view of the controller can of FIG. 7;

FIG. 9 is a top view of the controller can of FIG. 5;

FIG. 10 is an enlarged side cross-sectional view of a portion of the controller can taken along line 10-10 in FIG. 9, particularly illustrating the first spacer and the mounted printed circuit board secured to the first spacer;

FIG. 11 is an enlarged side cross-sectional view of a portion of the controller can taken along line 11-11 of FIG. 9, particularly illustrating a second spacer and the printed circuit board mounted to the second spacer;

Figure 15:
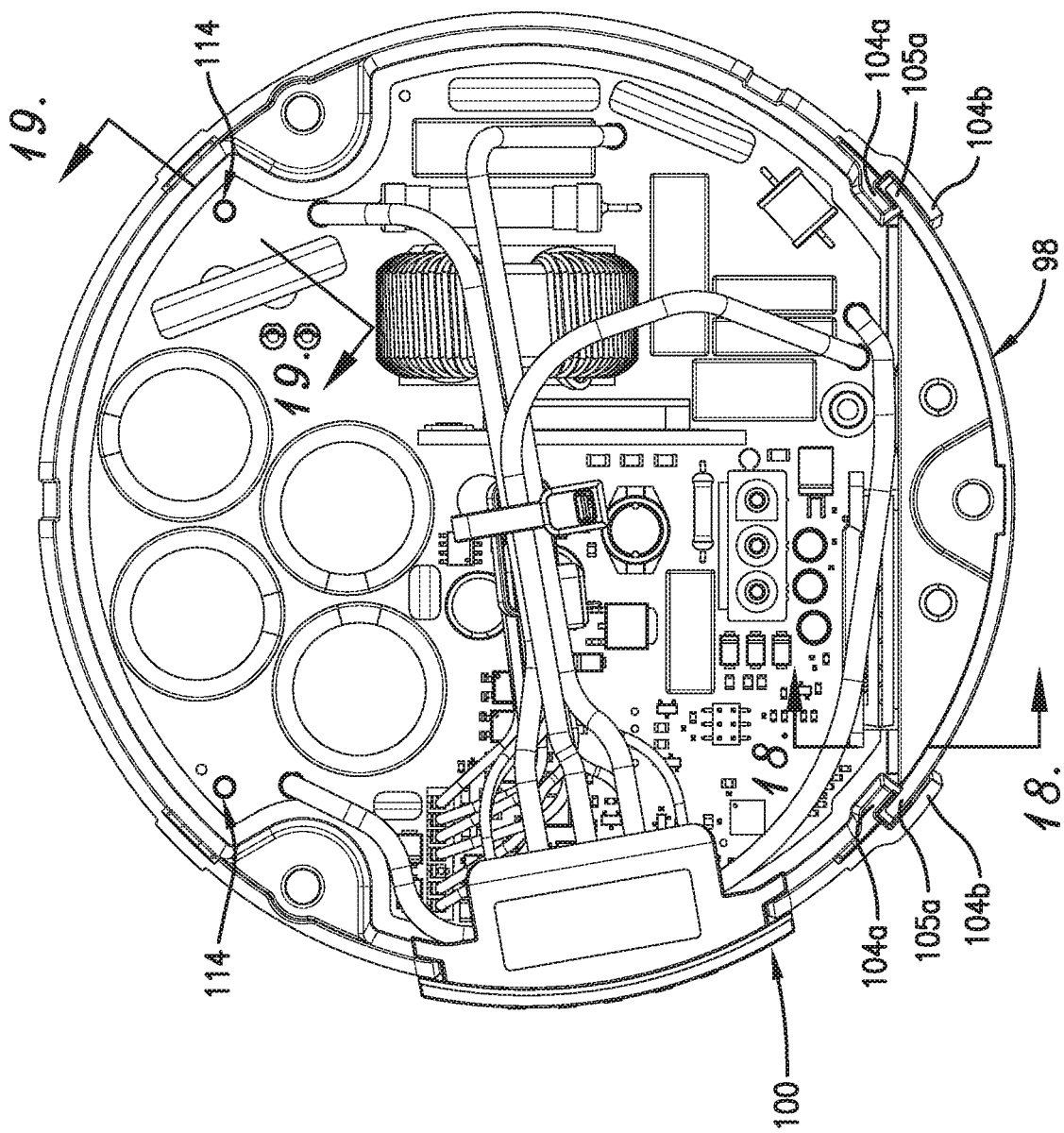
FIG. 15 is a top view of the controller can of FIG. 14.
Figure 16:
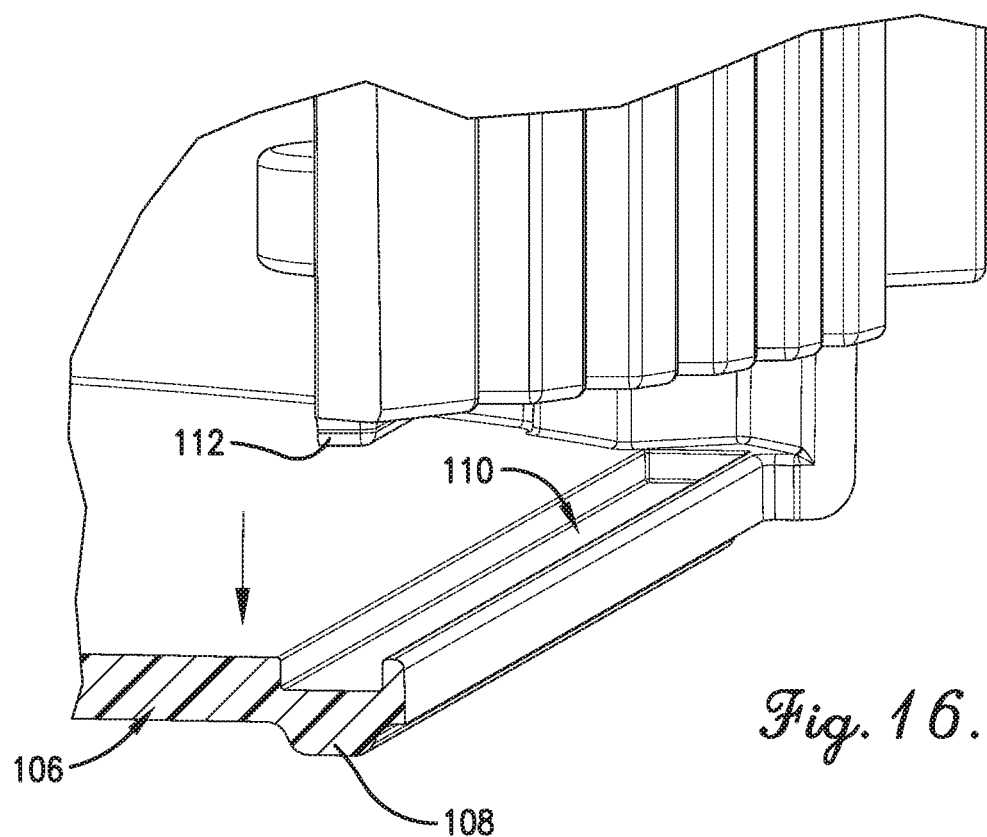
FIG. 16 is a partial and partially-sectioned view of the controller can of FIG. 14, particularly illustrating a metal insert and an end plate of the controller can, with the end plate being bisected along a center line of the metal insert and the metal insert and the end plate being complementarily shaped to engage in a tongue-and-groove mating relationship.
Figure 17:
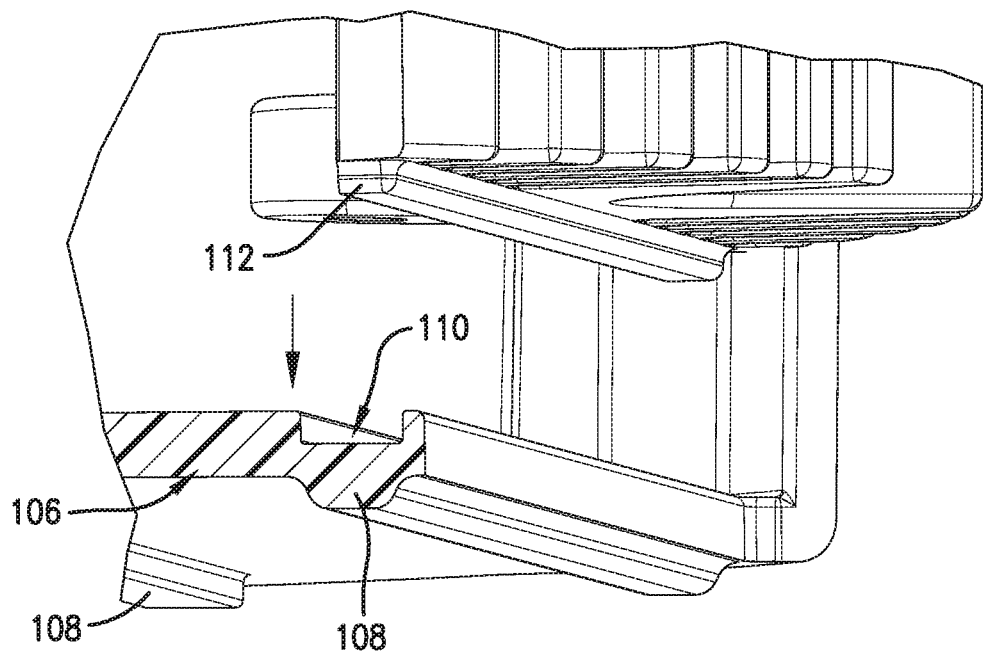
FIG. 17 is a rotated view of the controller can of FIG. 16, particularly illustrating aspects of an exterior surface of the end plate.
Figure 18:
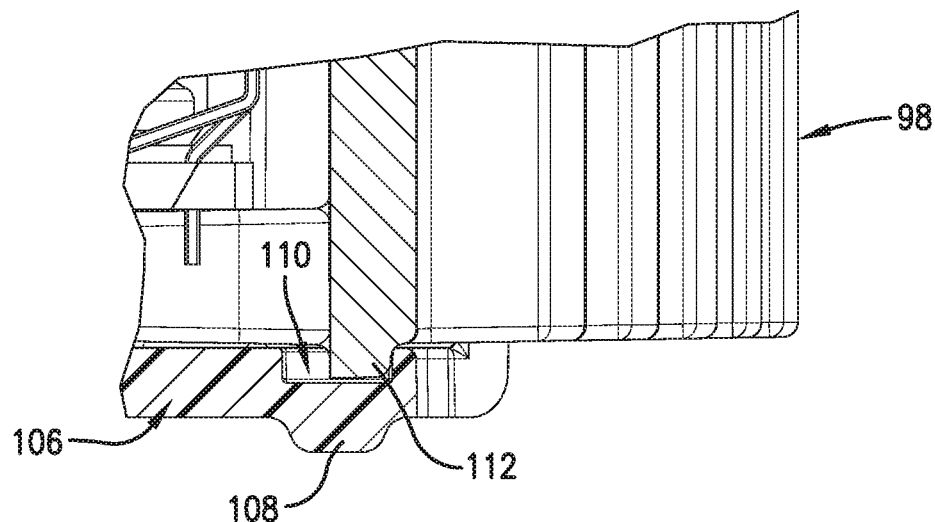
Figure 19:
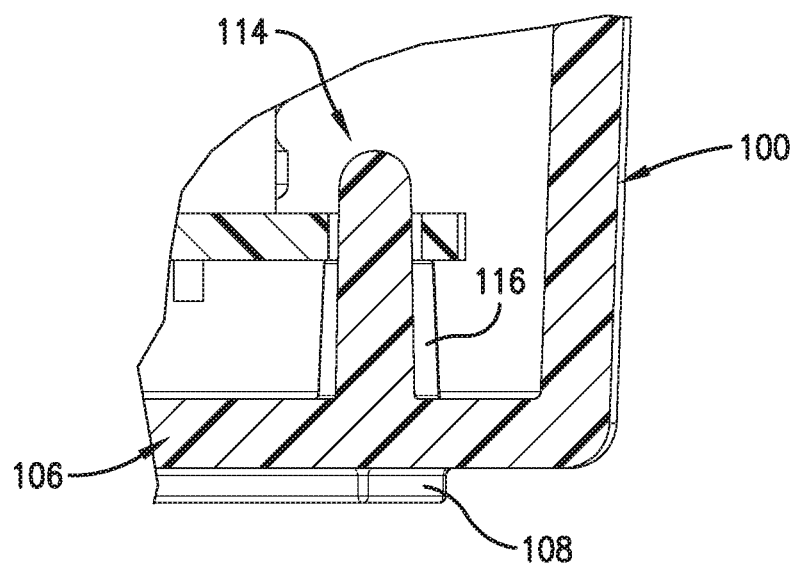

FIG. 18 is an enlarged cross-sectional view of a portion of the controller can taken along line 18-18 of FIG. 15, particularly illustrating the tongue-and-groove sealing engagement between the metal insert and the end plate; and FIG. 19 is an enlarged cross-sectional view of a portion of the controller can taken along line 19-19 of FIG. 15, particularly illustrating a short spacer having radially-extending spokes.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments. For instance, the drawing figures do not limit the present invention to the specific embodiments disclosed and described herein. The drawings are not necessarily to scale, emphasis instead being placed upon clearly illustrating the principles of the preferred embodiments. Furthermore, directional references (for example, top, bottom, up, and down) are used herein solely for the sake of convenience and should be understood only in relation to each other. For instance, a component might in practice be oriented such that faces referred to as "top" and "bottom" are sideways, angled or inverted relative to the chosen frame of reference.

Turning to FIGS. 1-4, an electric motor 12 according to the present inventive concept is illustrated. The motor 12 preferably includes a rotor 14, a stator 16 and a shaft 18. The rotor 14 is preferably rotatable about an axis at least in part defined by and/or along the shaft 18. However, an alternative rotation axis is permissible according to the present invention. For instance, a rotation axis might at least in part be parallel to, but spaced from, a shaft.

In a preferred embodiment, as illustrated, the motor 12 is an inner rotor motor. It is permissible, however, for an outer rotor motor, a dual rotor motor, or an alternatively configured motor to be used. The motor 12 may be operatively coupled to any one of a variety of machines, including but not limited to pool and spa pumps, furnace blowers, geothermal heat pumps, fan coil drivers, ventilators and/or filter units.

The motor 12 includes a motor housing 20 broadly having a first endshield 22, a second endshield 24 (see FIG. 4) a shell 26 extending between the endshields 22 and 24, and a controller can 28. The endshields 22, 24 and the shell 26 each preferably comprise steel, although other materials (for example, plastic or aluminum) may be used without departing from the scope of some aspects of the present invention. Most preferably, the endshields 22, 24 and the shell 26 comprise stamped steel. The controller can 28 will be discussed in more detail below.

Figure 1:
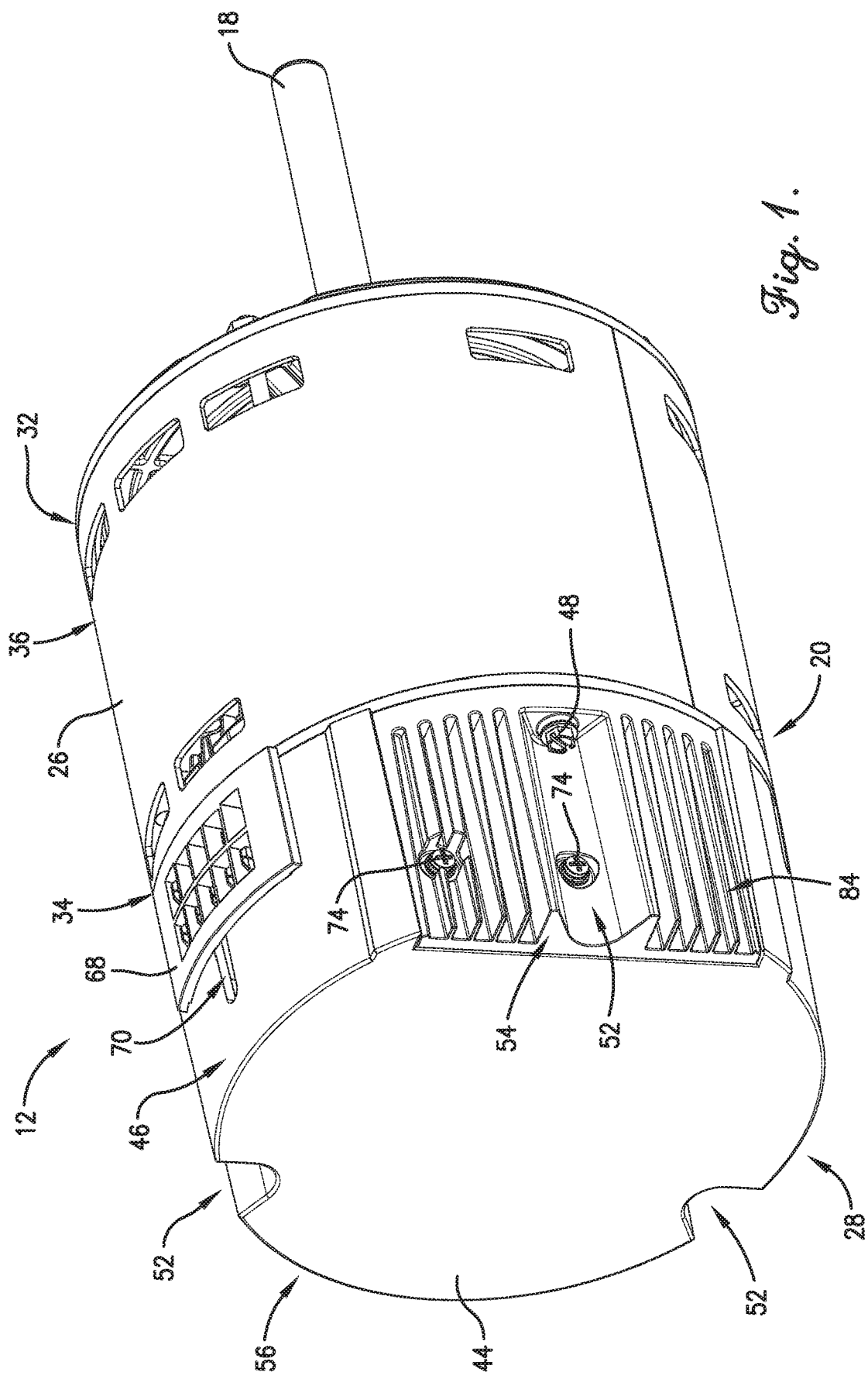
FIG. 1 is a rear perspective view of a motor in accordance with a preferred embodiment of the present invention.
Figure 2:
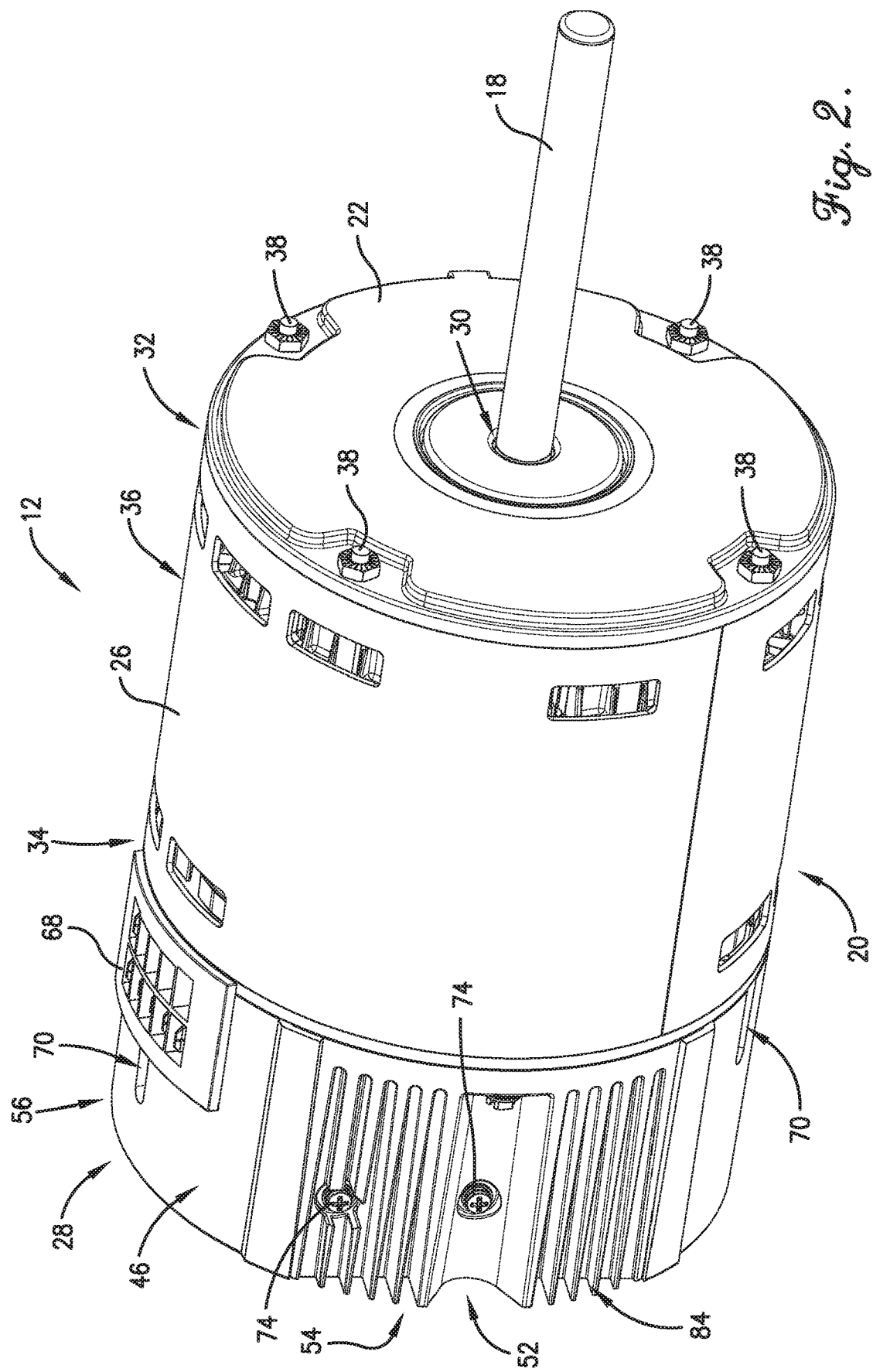
FIG. 2 is a front perspective view of the motor of FIG. 1.
Figure 3:
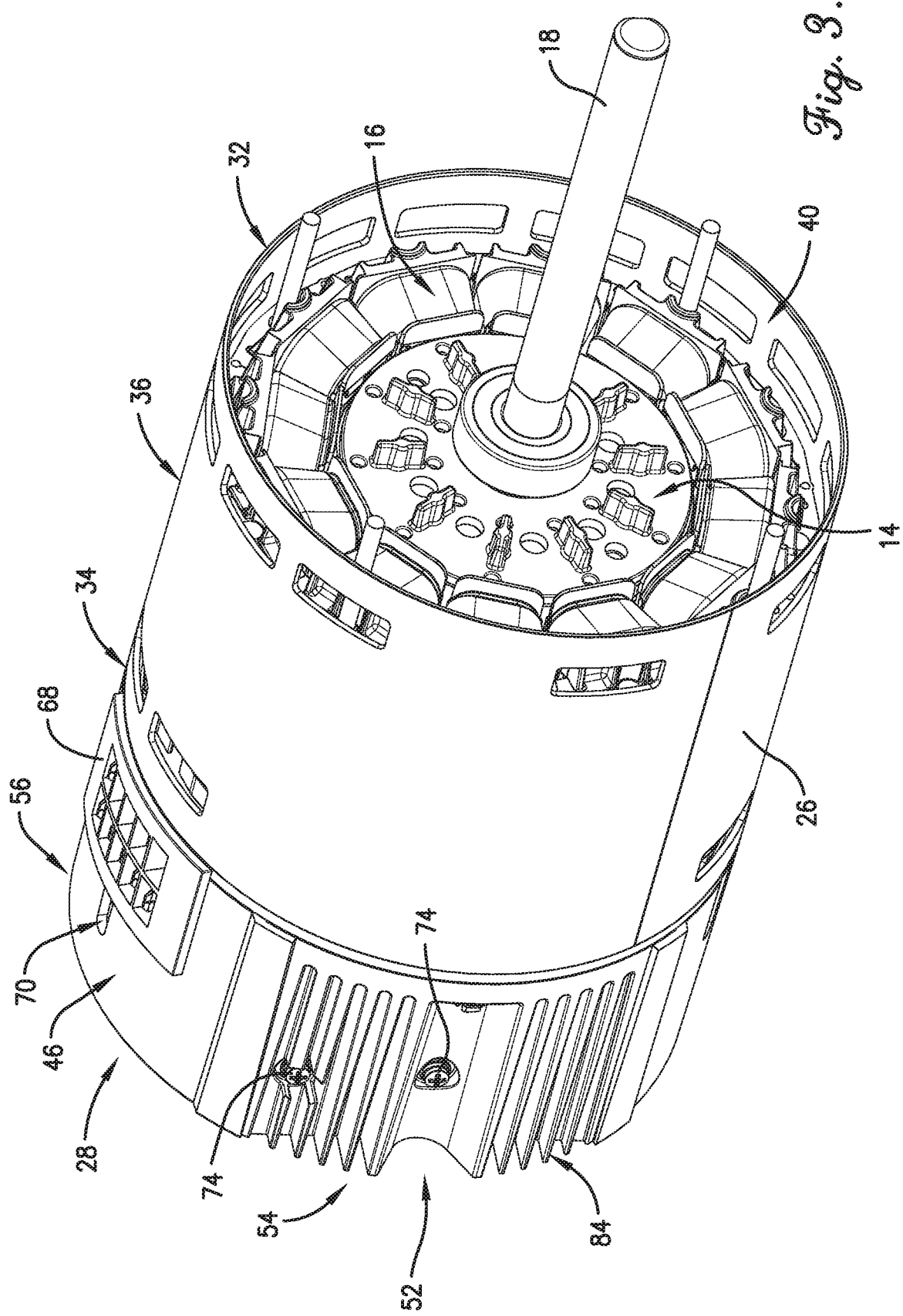
FIG. 3 is a front perspective view of the motor of FIG. 2, with a first endshield removed to particularly illustrate internal motor components.
Figure 4:
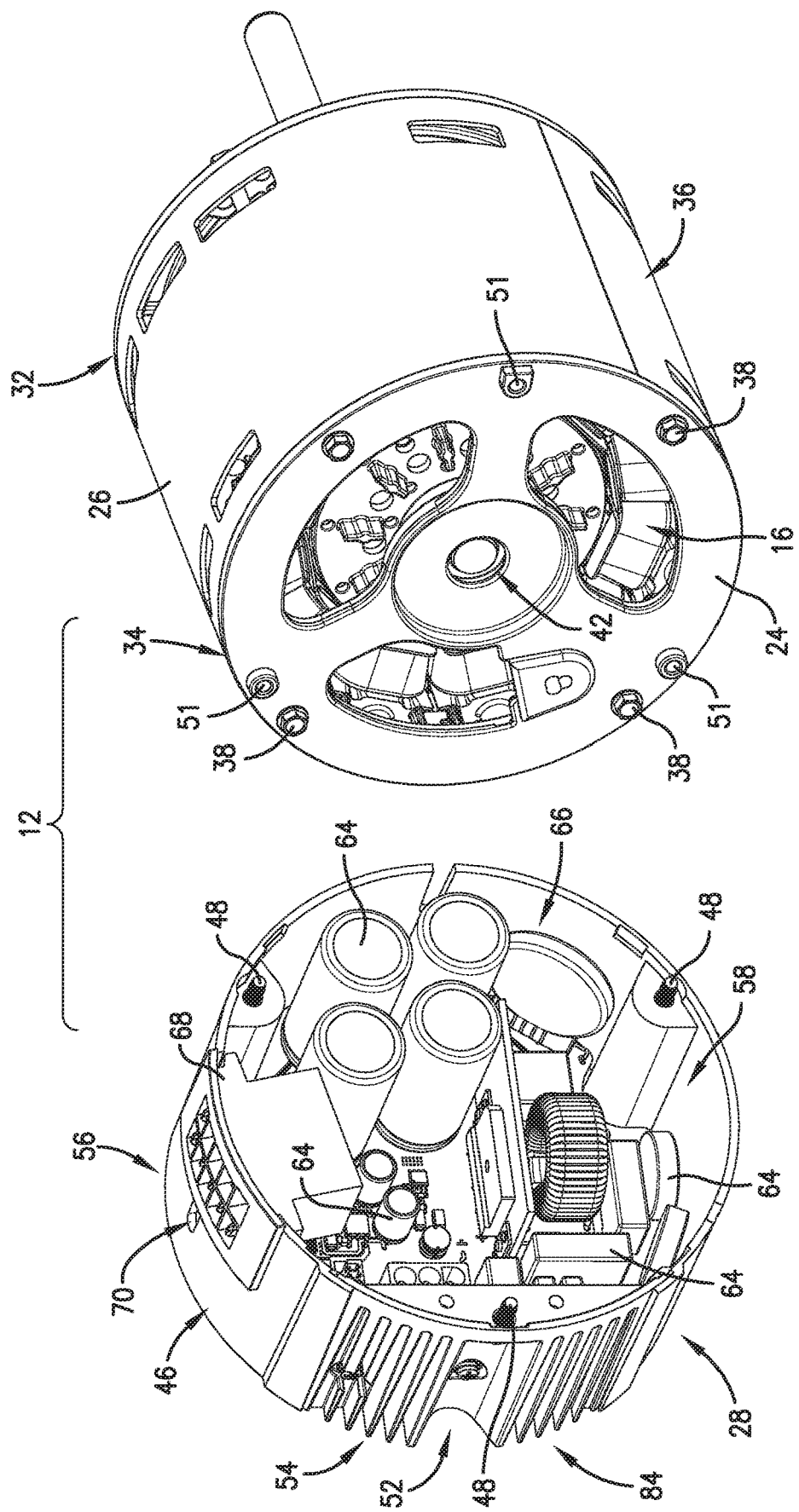
FIG. 4 is a partially exploded rear perspective view of the motor of FIGS. 1-3, particularly illustrating a second endshield partially defining a stator compartment and a controller can defining a controller compartment.

As best shown in FIGS. 3-4, the stator 16 is positioned axially between the endshields 22 and 24, as well as between the first endshield 22 and the can 28. The shell 26 is preferably likewise positioned axially between the first endshield 22 and the can 28. The first endshield 22 preferably defines a shaft opening 30. The shaft 18 preferably extends through the shaft opening 30.

The shell 26 preferably presents a generally radially extending first axial end 32, a generally radially extending second axial end 34 spaced axially from the first axial end 32, and a shell margin 36 extending generally circumferentially between the first and second axial ends 32 and 34. The shell 26 preferably extends generally circumferentially along the shell margin 36 so as to at least in part circumscribe the stator 16. The shell margin 36 is preferably defined by the outer circumferential face of the shell 26 and is therefore substantially curved. Although the shell margin 36 is preferably at least in part structurally defined, continuous structural definition is not required according to some aspects of the present invention, for instance in embodiments where a shell includes one or more ventilation slots.

The first endshield 22 preferably is secured relative to the shell 26 adjacent the first axial end 32. That is, the first endshield 22 preferably extends generally radially adjacent the first axial end 32 across the opening presented by the shell 26 at the first axial end 32.

The first endshield 22 (with the exception of the shaft opening 30) is preferably at least substantially solid in construction. (See FIG. 2) Passage of contaminants through the first endshield 22 to the stator 16 is thereby at least substantially restricted. It is permissible according to some aspects of the present invention, however, for openings to be formed in a first endshield for any one or more of a variety of purposes, including but not limited to heat dispersion or ventilation. The endshields 22, 24 are preferably secured to shell 26 with a plurality of arcuately spaced bolts 38, though it is foreseen that any one or more of a variety of fasteners or connection types—for example, buckles, clamps, clasps, clips, latches, nails, pins, rings, straps, welds and/or friction fits—may be employed without departing from the spirit of the present inventive concept.

Turning specifically to FIG. 4, the second endshield 24 preferably extends generally radially along the second axial end 34. Thus, the first endshield 22, the second endshield 24, and the shell 26 cooperatively at least partially define a stator compartment 40. (See FIG. 3) The stator compartment 40 at least partially, and preferably substantially completely, encloses the stator 16 therein.

The second endshield 24 preferably defines a bearing-receiving structure 42. A bearing (partially obscured in FIG. 4) is preferably received in the bearing-receiving structure 42. The bearing-receiving structure 42 preferably cooperates with another bearing-receiving structure (not shown) defined by the first endshield 22 to rotatably support the shaft 18 and other rotor 14 components generally within the compartment 40. The bearings may be of any type suited to the particular application. For instance, the bearings might be bushings or ball bearings.

The controller can 28 preferably includes a generally radially extending end plate 44 (see FIG. 1) and a generally axially extending skirt 46 projecting transversely from the end plate 44 toward the shell 26. The can 28—and, more particularly, the skirt 46—presents a can diameter. Preferably, the can diameter is at least substantially constant and symmetrical about and along the rotational axis, although variation is permissible within the scope of the present invention. For instance, a skirt might expand in a linear manner or be flared, and/or fins may be incorporated asymmetrically thereabout, without departing from the spirit of the present invention.

The shell 26 similarly presents a shell diameter. Preferably, the shell diameter is at least substantially constant and symmetrical about and along the rotational axis, although variation is permissible within the scope of the present invention. For instance, the shell might expand in a linear manner or be flared within the scope of the present invention.

Preferably, the can diameter and the shell diameter are substantially equal at the adjacent ends of the can 28 and the shell 26. That is, the can diameter immediately adjacent the second axial end 34 is preferably substantially equal to the shell diameter immediately adjacent the second axial end 34. Further, the second endshield 24 preferably presents an outer diameter that is at least substantially equal to the immediately adjacent shell and can diameters at the second axial end 34. Thus, the skirt 46, the second endshield 24, and the shell 26 may meet at one or more substantially continuous circumferentially-extending interface(s) at the second axial end 34 that enable electrical and thermal communication therebetween, it being understood that any such communication with the skirt 46 may be limited by the material used to construct the skirt 46.

Preferably, the motor 12 includes fasteners 48 that extend through and interconnect the second endshield 24 and the can 28. Preferably, the fasteners 48 are arcuately spaced apart. More preferably, the fasteners 48 are evenly arcuately spaced apart. Alternative arrangements, including irregular arrangements, are permissible according to some aspects of the present invention, however. Fasteners 48 preferably comprise bolts, though it is foreseen that any one or more of a variety of fasteners or other connection types—for example, buckles, clamps, clasps, clips, latches, nails, pins, rings, straps, welds and/or friction fits—may be employed without departing from the spirit of the present inventive concept.

In keeping with the above preferred fastener 48 configuration, the can 28 preferably defines a plurality of fastener-receiving openings 50 (see FIG. 9), and the second endshield 24 preferably includes a plurality of corresponding and aligning fastener-receiving bosses 51. The can 28 also preferably includes a plurality of recesses 52 to allow passage of the fasteners 48 thereby and to facilitate attachment of the fasteners 48 using traditional tools.

Figure 5:
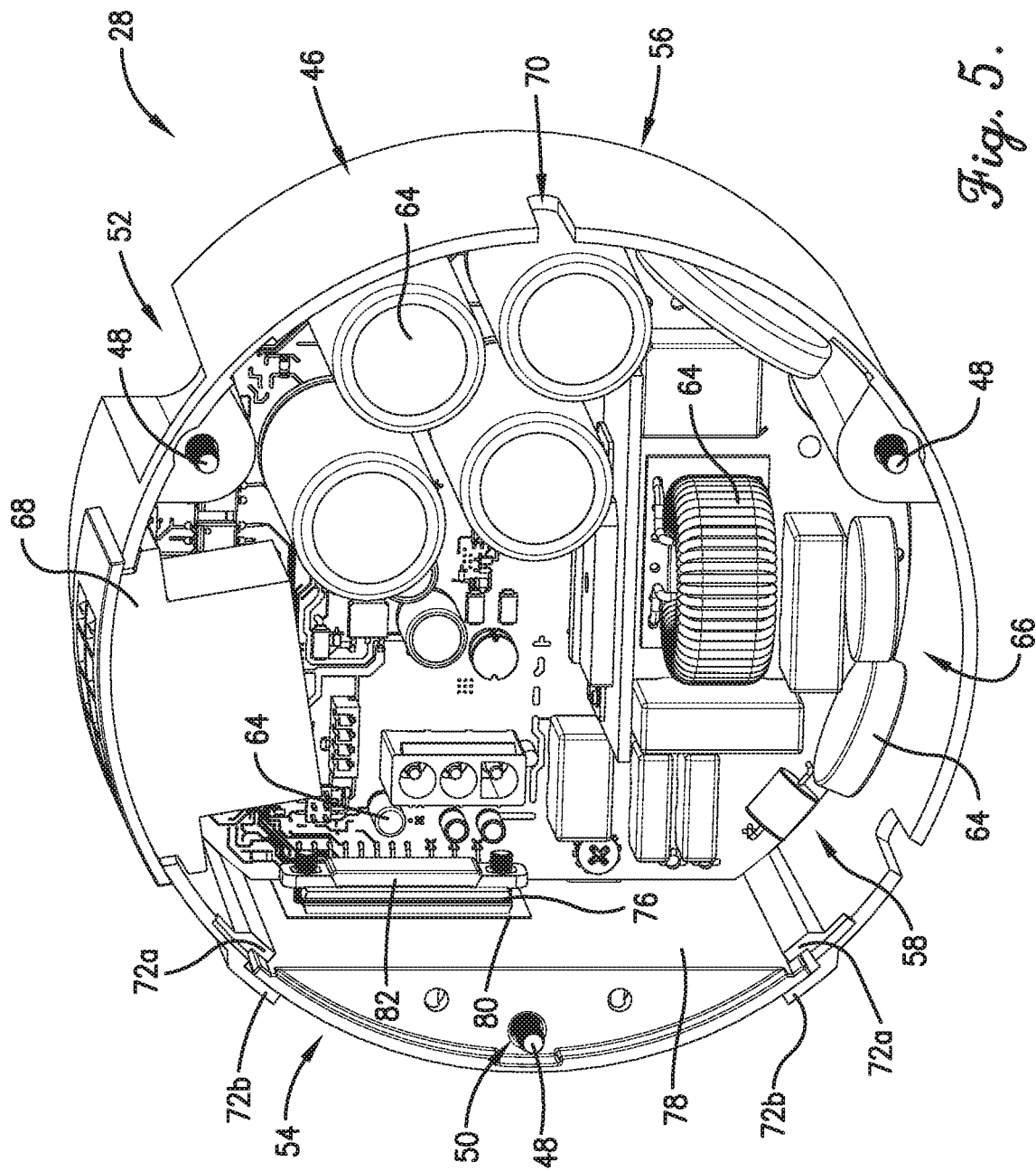
FIG. 5 is an enlarged front perspective view of the controller can of FIG. 4, particularly illustrating a metal insert of the controller can and electronic components of a controller disposed in the controller can.
Figure 6:
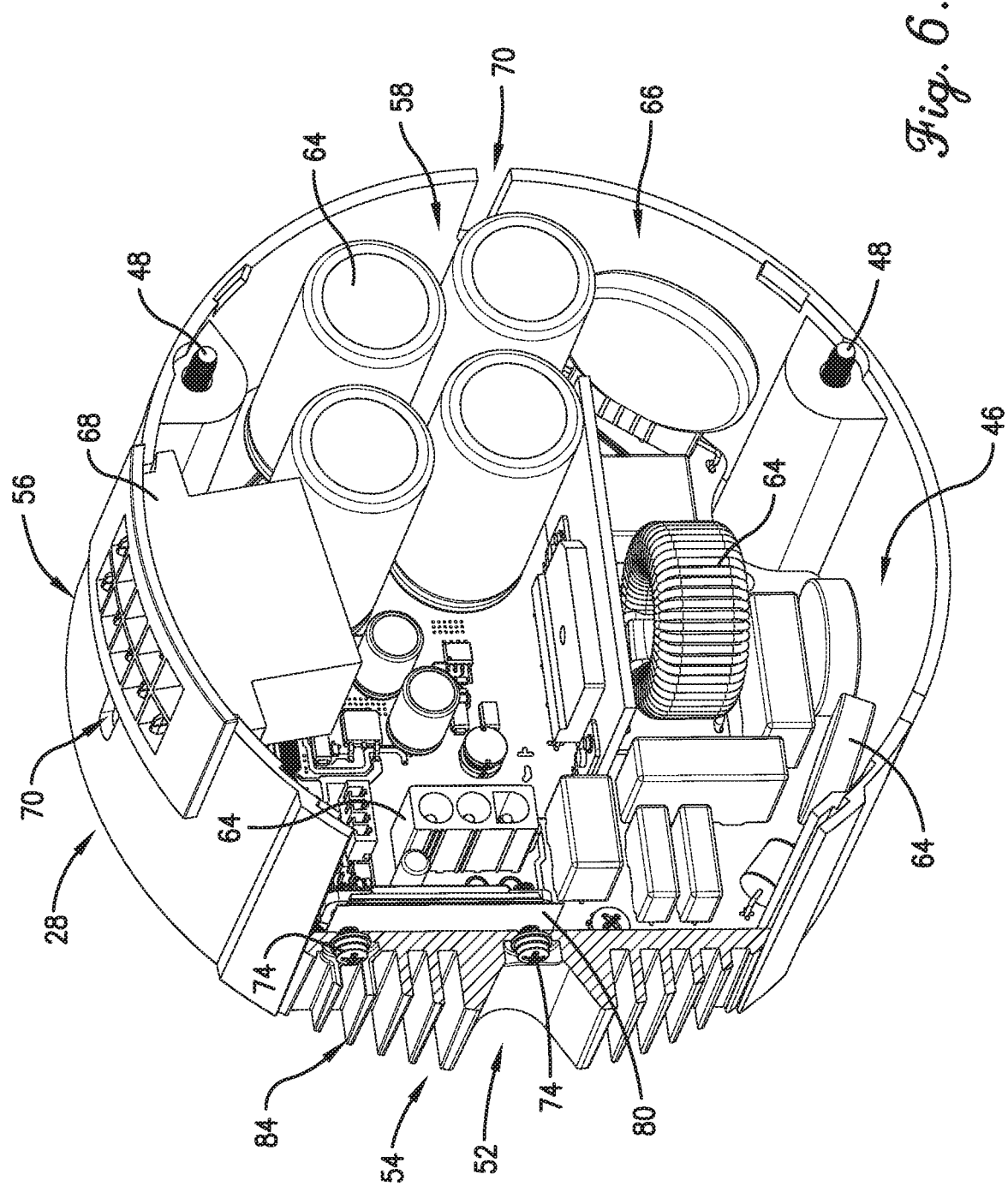
FIG. 6 is a rotated, partially-sectioned front perspective view of the controller can of FIG. 5, particularly illustrating surfaces for conducting heat from at least one of the electronic components to the metal insert.
Figure 7:
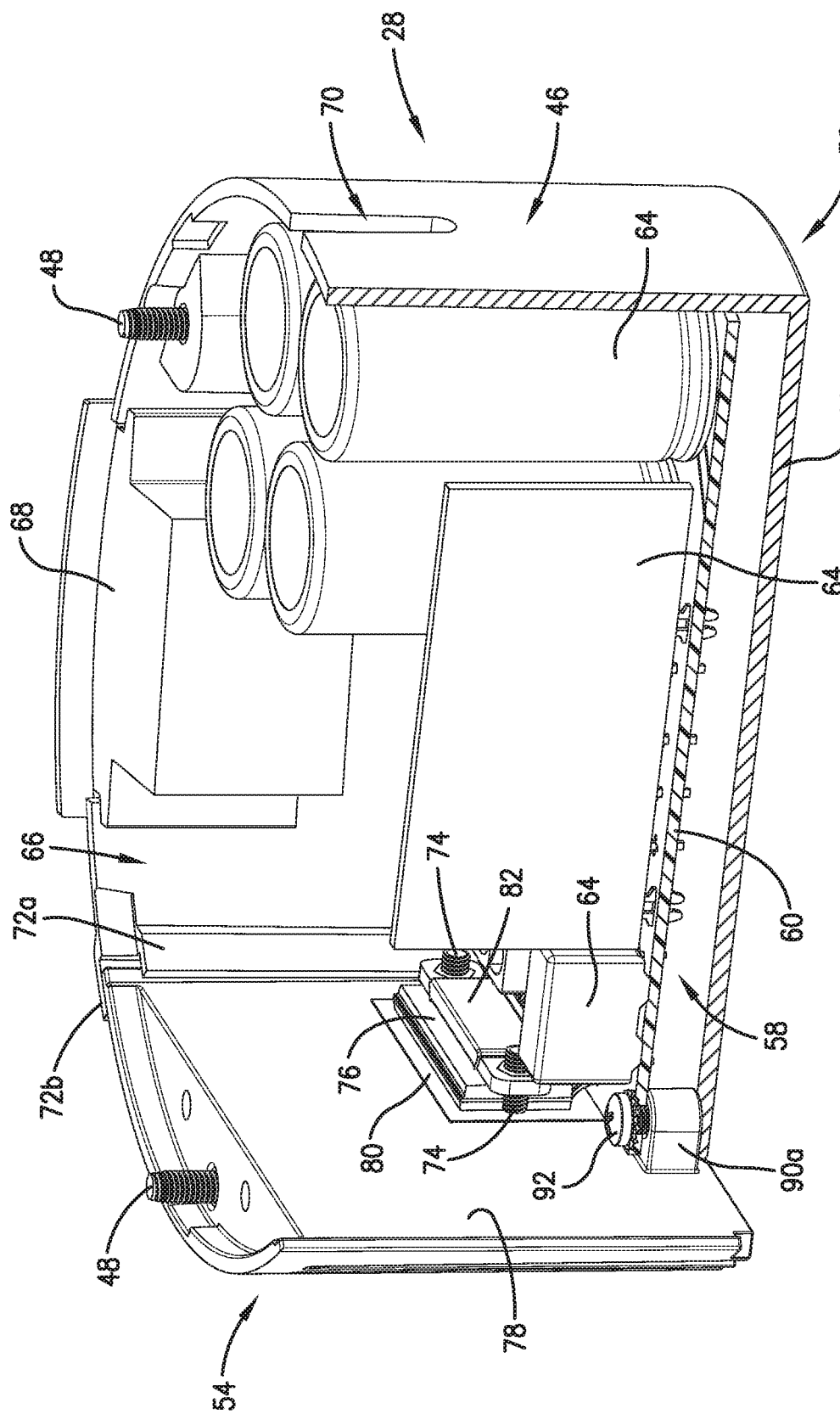
FIG. 7 is a partially-sectioned side perspective view of the controller can of FIG. 5, particularly illustrating a first spacer integral with the metal insert and a printed circuit board mounted to the first spacer.
Figure 12:
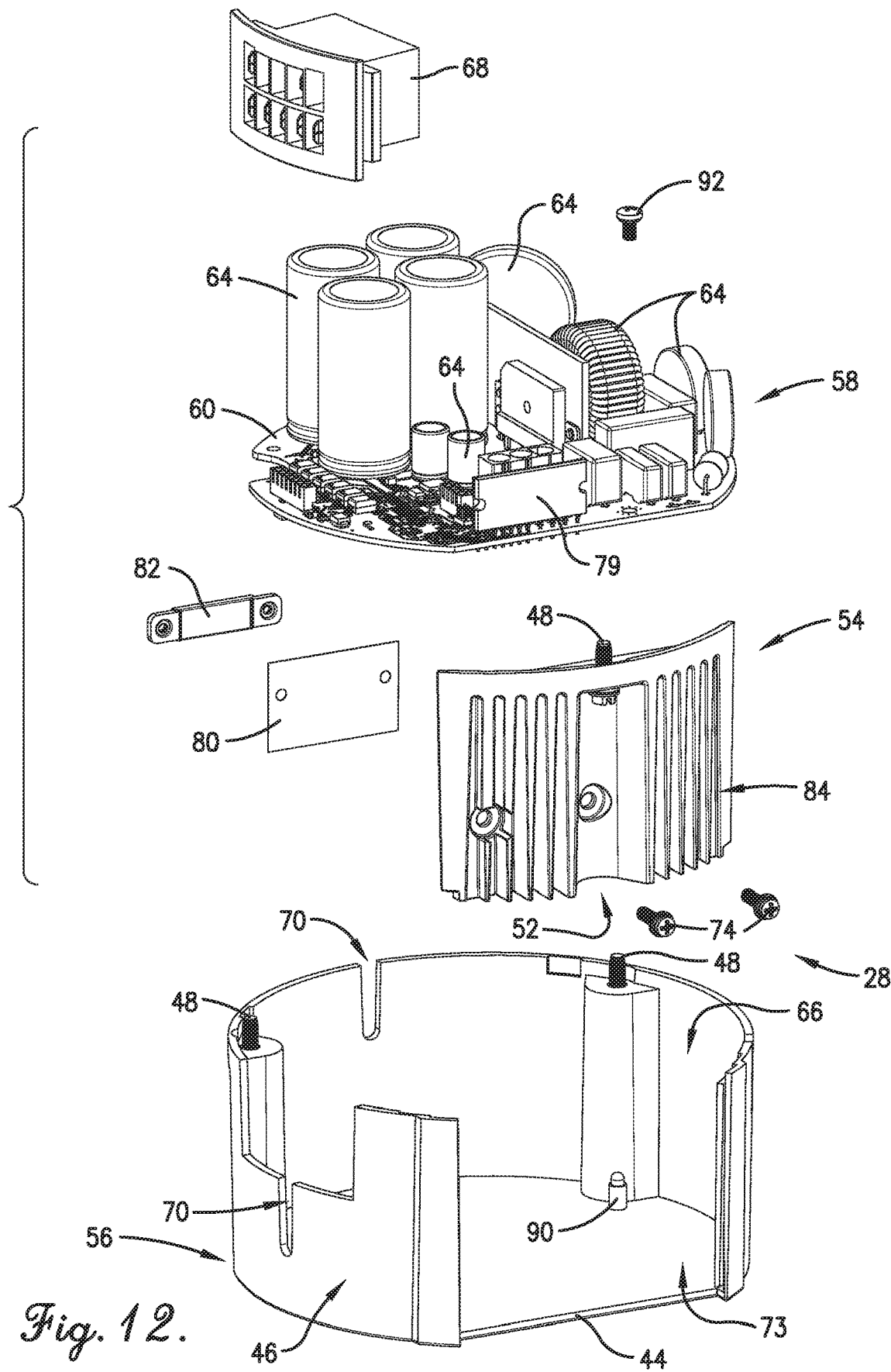
FIG. 12 is a partially exploded side perspective view of the controller can of FIG. 5, particularly illustrating aspects and contents of the controller can.

Turning briefly to FIG. 5, the can 28 preferably defines at least one can fastener-receiving opening 50 for securing a metal insert 54 (discussed in more detail below). For instance, a can housing 56 (also discussed in more detail below) may define two can fastener-receiving openings 50, and the metal insert 54 may define a third fastener-receiving opening 50. In this manner, at least one fastener 48 preferably holds the metal insert 54 against the second endshield 24 and/or the second axial end 34 of the shell 26. At least the fastener(s) 48 extending through the metal insert 54 are preferably comprised of thermally and/or electrically-conductive materials. More preferably, such fastener(s) 48 comprise copper and/or steel, though it is foreseen that other materials such as aluminum may be used without departing from the spirit of the present invention.

Figure 13:
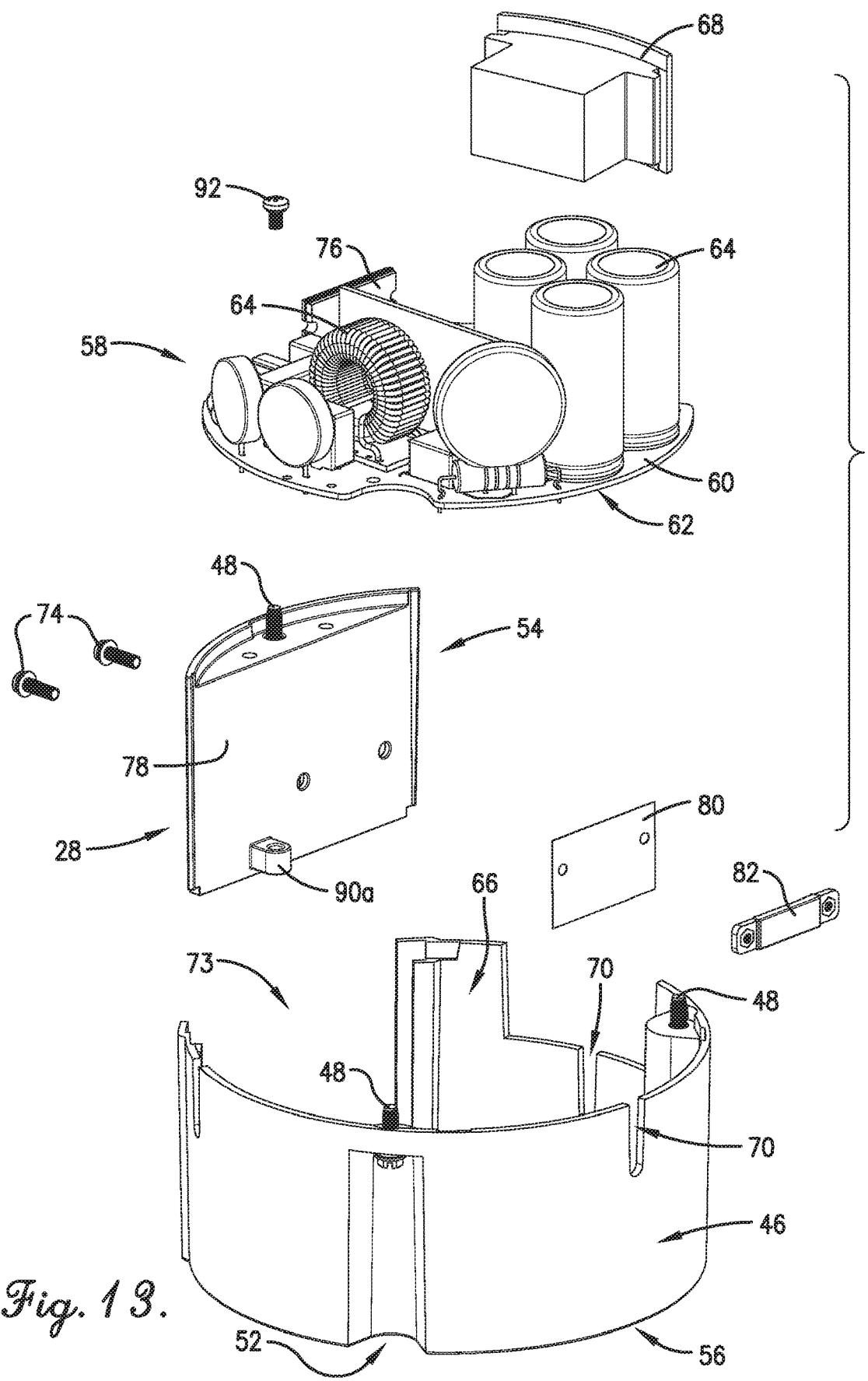
FIG. 13 is a rotated partially exploded side perspective view of the controller can of FIG. 12.

The motor 12 preferably also includes a controller 58. In a preferred embodiment, the controller 58 includes a substantially planar printed circuit board (PCB) 60 presenting an outer perimeter 62. (See FIG. 13) The controller 58 further preferably includes a plurality of electronics components 64 mounted on the PCB 60. The electronics components 64 may include primary control and/or pilot control devices, such as a power module (discussed in more detail below), a motor starter, float switches, pressure switches, magnetic contactors, contactor coils, circuit breakers and/or overload relays. However, any of a variety of controller types, configurations and components are permissible according to some aspects of the present invention.

The can 28 preferably partly or completely defines a controller compartment 66 in which the controller 58 is disposed. More particularly, the skirt 46 and the metal insert 54 at least substantially circumscribe the controller 58, with the controller 58 being disposed between the end plate 44 and the second endshield 24.

In a preferred embodiment, a connector element 68 is connected to the can 28. The connector element 68 is preferably configured for interconnection with an electrical conduit (not shown) and controller 58. More preferably, the connector element 68 is configured to carry power and control/configuration signals to and/or from the controller 58 for use in operation of the motor 12. However, it is within the scope of the present invention for a connector element to be configured for any required connection or to be excluded entirely from the motor. It is also permissible for an element to connect to a motor or housing at an alternative location.

The skirt 46 preferably defines one or more drainage holes 70 in fluid communication with controller compartment 66 to enable improved drainage of fluid from the compartment 66 (for example, to drain excessive condensation formed on the controller 58 and/or the second endshield 24). As will be readily apparent to those of ordinary skill in the art, the efficiency or, more broadly, the effectiveness of the drainage holes 70 will be at least in part dependent on their orientation. For instance, the illustrated drainage holes 70 are arcuately spaced around the radial perimeter of the can 28 and permit gravity to direct fluid away from the controller compartment 66 when the can 28 is in a variety of orientations. It is, however, foreseen that drainage holes and/or tubes may be defined and/or positioned within and about a controller can in a variety of configurations without departing from the spirit of the present inventive concept. For instance, drainage tubes may penetrate a PCB and potting (as applicable) for directing condensed water from an end plate-side of the printed circuit board toward drainage holes adjacent a second endshield.

Turning now to FIGS. 5-13, the can 28 preferably includes the metal insert 54 and the can housing 56. The can housing 56 preferably includes two pairs of opposing flanges 72 extending generally axially along either side of an opening 73 in the can housing 56. Each pair of flanges 72 includes an inner flange 72a radially spaced from an outer flange 72b that define a U- or V-shaped slot therebetween. The opposing flanges 72 are configured to receive the metal insert 54 within the slots and to at least partly secure the metal insert 54 against radial and/or circumferential movement with respect to the housing 56. (See FIG. 9) In an assembled motor 12, the metal insert 54 is preferably press fit into the slots formed by the flanges 72. Preferably, the metal insert 54 also defines at least one of the arcuately spaced recesses 52 through which a fastener 48 may be accessed for securement of the metal insert 54 to the second endshield 24 and/or the shell 26. (See FIG. 1) More particularly, the metal insert 54 is preferably secured to the second endshield 24 (and thereby the shell 26) by one or more fasteners 48.

The metal insert 54 is also secured to the can housing 56 and/or components 64 housed therein by fasteners 74, which may substantially restrict axial movement of the metal insert 54 with respect to the skirt 46. Fasteners 74 preferably comprise bolts, though it is foreseen that any one or more of a variety of fasteners or other connection types—for example, buckles, clamps, clasps, clips, latches, nails, pins, rings, straps, welds and/or friction fits—may be employed without departing from the spirit of the present inventive concept. The fasteners 74 may assist with thermal transfer between the controller 58 and the metal insert 54, and/or may provide grounding for the controller 58 to assist with controlling EMI emissions. The fasteners 74 therefore preferably comprise thermally and/or electrically conductive metal(s).

In the preferred embodiment, the fasteners 74 may be directly or indirectly fixed to a power module 76 (described below) of the controller 58 for transferring heat and/or EMI emissions to the insert 54 and/or an exterior of the can 28. One of ordinary skill will appreciate that grounding the controller 58 using the fasteners 74 may be achieved at least in part via contact between the fasteners 74 and the metal insert 54, and between the metal insert 54 and the shell 26 (whether directly and/or through the second endshield 24). One of ordinary skill will appreciate that other methods and/or structures for securing a metal insert to a controller can, electronic components, endshield and/or shell—and/or to a motor more generally—are within the scope of the invention. For instance, a metal insert may be welded to a can housing without departing from the spirit of the present invention.

The metal insert 54 is preferably exposed to the exterior of the can 28, which may be an ambient environment and/or other heat sink. That is, the exterior of the can 28 is preferably capable of acting as a heat sink to absorb heat in order to support rapid heat transfer from the can 28 to an external heat sink space. The metal insert 54 preferably at least partially radially circumscribes the controller compartment 66 to provide surface area and a medium for heat transfer to the external heat sink space. Moreover, the metal insert 54 extends axially along a substantial portion of the controller compartment 66, again to provide surface area for heat transfer to the external heat sink space. (See FIG. 1) Preferably, the metal insert 54 presents between about ten percent (10% and about forty percent (40%) of the surface area of the can 28 that faces external heat sink space (for example, the ambient environment), otherwise referred to herein as "exposed surface area," with the remainder being presented by the can housing 56. More preferably, the metal insert 54 presents between about twenty percent (20%) and about thirty percent (30%) of the exposed surface area of the can 28. The illustrated metal insert 54 spans roughly one and forty-five hundredths (1.45) radians or about eighty-three degrees)(83°) of the circumference of the can 28 and extends substantially from the end plate 44 to the second endshield 24. It is foreseen that the relative proportions and dimensions of the illustrative embodiments may vary—for example because of varied thermal and/or electrical outputs and/or emissions of controller components and/or selected material properties—without departing from the spirit of the present invention, as described in more detail below.

Preferably, the metal insert 54 is positioned adjacent to and/or is conductively connected to at least one primary heat and/or EMI source housed in or adjacent to the controller compartment 66. The metal insert 54 preferably transfers heat and/or dissipates EMI emissions generated and/or conducted by such source(s) with rapidity and efficiency, and may moderate the EMI emissions and/or temperature within the controller compartment 66 during operation of the motor 12.

In the illustrated embodiment, the power module 76 of the components 64 abuts and is thermally connected to the metal insert 54. That is, the power module 76 transfers thermal energy to the metal insert 54 directly through conductive contact and/or indirectly via conductive contact with one or more intermediaries having relatively favorable heat transfer properties and dimensions for heat transfer. More preferably, the heat transfer properties of any such intermediary are at least as conducive to heat transfer as the material(s) comprising the metal insert 54, and are dimensioned so as to provide for efficient heat transfer to the metal insert 54.

More particularly, the metal insert 54 preferably includes a substantially planar interior surface 78. Power module 76 preferably includes a broad, and preferably substantially planar, outward-facing surface 79 that sits adjacent and substantially parallel to the interior surface 78. Sandwiched between the power module 76 and the metal insert 54 is preferably a thermal conductive sheet 80 for absorbing heat from the power module 76 and distributing same across a broader surface area along the interface with interior surface 78 of the metal insert 54. The thermal conductive sheet 80 preferably comprises aluminum, but may also comprise zinc, copper or the like without departing from the spirit of the present invention. It is not necessary in some aspects of the present invention for an interior surface and an outward-facing surface of a metal insert to be complemental in shape, however. Where included, it is important for the conductive component to be sandwiched therebetween, but the shapes and sizes of the interior and outward-facing surfaces may be different.

Moreover, grounding the conductive sheet 80 and/or insert 54 (for example, to the shell 26) may help dissipate EMI conductive and/or radiated emissions from the PCB 60, power module 76 and/or other components 64. It is foreseen that placement of other electronics components and/or parts of a motor near and/or in conductive connection with a metal insert may be prioritized without departing from the spirit of the present inventive concept. For instance, capacitors and/or a bridge of the motor may be good candidates for such placement.

The power module 76, conductive sheet 80, and metal insert 54 are preferably fixed together by the fasteners 74. More particularly, fasteners 74 extend through two aligned sets of holes formed through the metal insert 54 and through opposing sides of the conductive sheet 80 and power module 76. Interior ends of the fasteners 74 may be secured to a rigid strip 82 inside the controller compartment 66. For instance, the fasteners 74 may comprise threaded bolts received within correspondingly threaded apertures defined by the rigid strip 82. The rigid strip 82 may be at least as wide as the power module 76, and may be formed of insulative material. The PCB 60, components 64, power module 76 and/or the planar surface 78 can be selectively positioned at a plurality of locations relative to the metal insert 54.

The rigid strip 82 may substantially hold the power module 76 against the conductive sheet 80, thereby helping to maintain efficient heat transfer therebetween. The rigid strip 82 may also inhibit heat transfer into the controller compartment 66, at least by covering a portion of an inner face of the power module 76 with insulative material. In an embodiment, such insulative material may comprise the material that forms the can housing 56. It is foreseen that other means of fastening and/or maintaining conductive contact between a metal insert and heat and/or EMI source(s) within a controller compartment may be employed without departing from the spirit of the present inventive concept.

The metal insert 54 preferably also defines a plurality of heat transfer fins 84, as illustrated in the Figures. The fins 84 are configured to disperse heat from the controller compartment 66. In a preferred embodiment, the plurality of fins 84 extend generally axially at least partly along the axial extent of the controller compartment 66, and at least substantially to or beyond an outer axial side of the conductive sheet 80.

Other heat transfer-enhancing surface structure may be incorporated into a metal insert and/or controller can more generally without departing from the spirit of the present invention.

It should be noted that a preferred interior margin presented along interior surface 78 of the metal insert 54 differs substantially from a preferred outer margin 86 presented by the metal insert 54. (See FIG. 9) Whereas the interior surface 78 is preferably substantially flat and optimized to maximize surface area for conductive heat transfer directly from an electronic component 64 such as the power module 76, the outer margin 86 of the metal insert 54 is substantially arcuate (though the exposed surface area of the metal insert 54 may be discontinuous in view of the fins 84 and recess 52). The substantially arcuate outer margin 86 of the metal insert 54—together with the fins 84—help increase surface area for heat exchange with the external heat sink space. In this manner, a preferred metal insert may present inner and outer margins of substantially different shape and/or configuration—i.e., a substantially flat inner margin and a substantially arcuate outer margin—for enhanced heat transfer to the external heat sink space. One of ordinary skill will appreciate that inner and outer margins of a metal insert may be otherwise configured to enhance moderation of temperature and/or EMI emissions within a controller can within the scope of the present invention.

The metal insert 54 partially circumscribes the controller compartment 66 adjacent the second axial end 34, and extends axially along a substantial portion of controller compartment 66. The relative expanse of the illustrative metal insert 54 is therefore representative of a configuration that may sufficiently moderate temperature and/or EMI emissions within the controller compartment 66 to acceptable levels during certain exemplary operational conditions, as discussed in more detail above. The configuration of the illustrated embodiment preferably permits placement of the controller 58 in proximity to the end plate 44 (see FIG. 7) relative to prior designs. The can 28 may include short spacer(s) 90 for maintaining modest spacing between the end plate 44 and the controller 58.

In the preferred embodiment, the aforementioned positioning of controller 58 within controller can 28 permits orientation of electronics components 64 along the PCB 60 so as to maximize surface area exposed to an interior of the controller compartment 66. Generally, placement of the PCB 60 closer to the end plate 44 may provide sufficient "headroom"—or axial spacing from the second endshield 24—within the controller compartment 66 to allow the components 64 to be "stood up." This may enhance heat transfer within the controller compartment 66 for temperature moderation, for example where air circulation between the controller compartment 66 and the stator compartment 40 (for example, via apertures in the second endshield 24) helps ventilate and move heat away from the components 64. In preferred embodiments, enabling placement of PCB 60 and/or components 64 closer to portions of the can housing 56—i.e., through moderating temperature and/or EMI emissions within the controller compartment 66 using metal insert 54—may also simplify manufacturing (for example, casting) processes and reduce costs.

It should be noted that, in varying applications and/or under varying conditions, the sufficiency of the size of a metal insert may vary according to factors such as: the amount of heat and/or EMI emissions convected and/or radiated from and/or conducted via components and parts adjacent to or within the controller can; the temperature gradient between the interior and exterior of the controller can; the proximity of the metal insert to the primary heat and/or EMI emission source(s) and/or insulative barriers therebetween; and other factors that may become apparent to one of ordinary skill upon review of this disclosure. For instance, it is foreseen that, in other embodiments, the heat transfer demands on an insert—and, therefore, the recommended dimensions and placement thereof within the can housing—may vary during normal operational cycles of the motor. The degree of power supplied to the motor and the ambient temperature may vary during normal operational cycles, and normal variances such as these are preferably considered when dimensioning the insert. Moreover, a metal insert may in some embodiments help dispel heat generated by operation of the motor within or immediately adjacent a stator compartment, which may also be taken into account in designing a controller can according to the present invention.

It is foreseen that the positioning of a metal insert with respect to a PCB, electronics components and/or other heat-producing and/or conducting elements within a controller can may be varied to maximize the rate of heat transfer to the exterior and/or to achieve other design goals without departing from the spirit of the present inventive concept. Likewise, it is foreseen that the span and/or axial length of a metal insert, along with its thickness, may be varied according to the heat transfer requirements of particular motors without departing from the spirit of the present inventive concept.

Can housing 56 material may be selected from a group of materials having relatively low heat conductivity. More particularly, each such material may be selected for its ability to remain at or below a certain temperature during operation of motor 12, thereby preventing heat damage that may otherwise be caused by proximity of the can housing 56 (for example, an inner surface of end plate 44) to the controller 58 (for example, to traces of the PCB 60 and/or components 64). Preferably, the can housing 56 may comprise a plastic. More preferably, the can housing 56 comprises a polycarbonate. It is also foreseen that the can housing 56 may comprise stamped steel or other synthetic materials without departing from the spirit of the present invention. It should be noted that certain grounding techniques for dispersing EMI emissions from the controller compartment 66 may be unavailable where a relatively poor conductor (for example, polycarbonate) is chosen for use in constructing the can housing 56.

In contrast, the material of the metal insert 54 is preferably selected from a group of metals having relatively high thermal conductivity. More particularly, each such metal is preferably selected for its ability to transfer heat efficiently and quickly from the controller compartment 66 to the external heat sink space. Preferably, the selected metal exhibits a thermal conductivity (for example, in watts per square meter) at least four (4) times that of the material(s) comprising the can housing 56. More preferably, the thermal conductivity of the metal comprising the metal insert 54 is at least about ten (10) times that of the material(s) comprising the can housing 56. The metal insert 54 preferably comprises aluminum, but may also comprise zinc, copper, combinations of the foregoing, or the like. It is foreseen that the selection of the material(s) comprising can housing 56 and metal insert 54 may vary with geometric, compositional and/or operational parameters across various applications, and that such selection will be within the abilities of one of ordinary skill upon review of this disclosure.

The preferred embodiment described herein provides numerous advantages. Among other things, for instance, the can housing 56 preferably provides a less damaging surface for positioning adjacent sensitive components such as the traces of PCB 60 and/or components 64, as compared with prior art controller cans, without the need for expensive and/or cumbersome insulative inserts or the like. This preferably provides additional space within which components 64 may be positioned advantageously within the controller compartment 66 to, for example, prevent obstruction of ventilation passing through the second endshield 24 from the stator compartment 40 and optimize the profile thereof to maximize ventilation, as described in more detail above.

It is preferred that substantially all of the can housing 56 consists of a low-conductivity material (such as a material A), and that substantially all of the metal insert 54 consists of a relatively high-conductivity material (such as a material B). However, it should be noted that the can 28, the can housing 56, the end plate 44, the skirt 46 and/or the metal insert 54 may each be formed of multiple materials without departing from the spirit of the present invention. In an embodiment, at least seventy percent (70%) (by volume) of the end plate 44 consists of a homogenous material A (for example, a polycarbonate or a stamped steel), providing a relatively low-temperature surface near which components 64 may be disposed with reduced risk of heat damage. Similarly, at least seventy percent (70%) (by volume) of the metal insert 54 may consist of a homogenous material B (for example, aluminum), providing a relatively high thermal conductivity material for dissipating heat to an external heat sink space.

In such an embodiment, for example, portions of an end plate—for example, areas not sitting adjacent PCB and/or electronic components—may be formed of relatively high thermal-conductivity material(s) within the scope of the present invention. Substantially all portions of an end plate that are adjacent (for example, in axial alignment with) a PCB and/or electronic component are preferably formed of a relatively low thermal conductivity material. Likewise, portions of a metal insert—for example, those not sitting adjacent (that is, in radial alignment with) a significant heat source of the electronic components—may be formed of relatively low thermal-conductivity material(s) within the scope of the present invention.

It will therefore be apparent to one having ordinary skill that the following advantages may be addressed in embodiments of the present invention: positioning of relatively high thermal-conductivity portion(s) of a metal insert within a controller can adjacent significant heat source(s); positioning of relatively low thermal-conductivity portion(s) of an end plate adjacent heat-sensitive controller components; and providing a controller can wherein between about ten percent (10%) and about forty percent (40%), and more preferably between about twenty percent (20%) and about thirty percent (30%), of the exposed surface area of the can 28 is presented by a homogenous and relatively high thermal-conductivity material (such as aluminum) of the metal insert, in order to provide for enhanced heat transfer from a controller compartment.

Moreover, the can housing 56 may be configured to optimize electrical communication between the can 28 and the controller 58 according, for example, to the degree of grounding required to control EMI emissions. In an embodiment, at least one spacer 90a comprises a cast ground mounting pad formed integrally with and/or otherwise in conductive communication with the metal insert 54, for example by being cast or otherwise monolothically formed with the metal insert 54 and/or welded thereto. (See FIG. 7) Preferably, the cast ground mounting pad spacer 90a comprises a conductive material the same as or complementary to that comprising the metal insert 54. For instance, the mounting pad spacer 90a may comprise aluminum, but may also comprise zinc, copper, combinations thereof, or the like. The cast ground mounting pad spacer 90a may be fastened to the PCB 60 and/or one or more components 64 by a fastener 92. Preferably, the fastener 92 also comprises electrically conductive material such as aluminum, zinc, copper or the like. Electrical communication between the PCB 60 and the cast ground mounting pad spacer 90a may occur, for example, along traces (not shown) of the PCB 60.

Particularly in embodiments in which the can housing 56 comprises material of low thermal and/or electrical conductivity, the illustrated cast ground mounting pad spacer 90a may help ground and/or dissipate EMI emissions from the PCB 60 and/or components 64. More particularly, the cast ground mounting pad spacer 90a may conduct heat and/or EMI emissions to the metal insert 54. These effects may be improved still further through electrical communication between the metal insert 54 and one or both of the second endshield 24 and shell 26, for example because of the surface contact therebetween along the second axial end 34 of the shell 26 in the illustrated embodiment. One of ordinary skill will appreciate that the controller 58 (for example, the PCB 60 and/or components 64) may also or alternatively be ground by and/or may dissipate EMI emissions via electrical communication with the can housing 56 and/or otherwise with the second endshield 24 and/or shell 26 (for example, via a ground wire) within the scope of the present invention.

It should be noted that references herein to "external heat sink space(s)" and the like generally refer to the surroundings of a controller can, and there is no requirement that such "space(s)" comprise open-air areas or otherwise include gaseous mixtures, it being understood that "external heat sink space(s)" may comprise cooling liquids and/or enclosed compartments without departing from the spirit of the present invention. Similarly, one of ordinary skill will appreciate that the term "exposed surface area" as used herein refers to exposure of surface area to the surroundings of the controller can (rather than being internal to the motor), and there is no requirement that such surface area be "exposed" to any particular substance to be considered "exposed surface area."

Turning now to FIGS. 14-19, a second preferred controller can 94 is illustrated. It is initially noted that, with certain exceptions to be discussed in detail below, many of the elements of the controller can 94 of the second embodiment are the same as or very similar to those described in detail above in relation to the controller can 28 of the first embodiment. Furthermore, with the exceptions to be discussed in more detail below, the controller can 94 of the second preferred embodiment is suitable for use with associated devices otherwise configured like the motor 12 and controller 54.

Therefore, for the sake of brevity and clarity, redundant descriptions and numbering will be generally avoided here. Unless otherwise specified, the detailed descriptions of the elements presented above with respect to the first embodiment should therefore be understood to apply at least generally to the second embodiment, as well.

Figure 14:
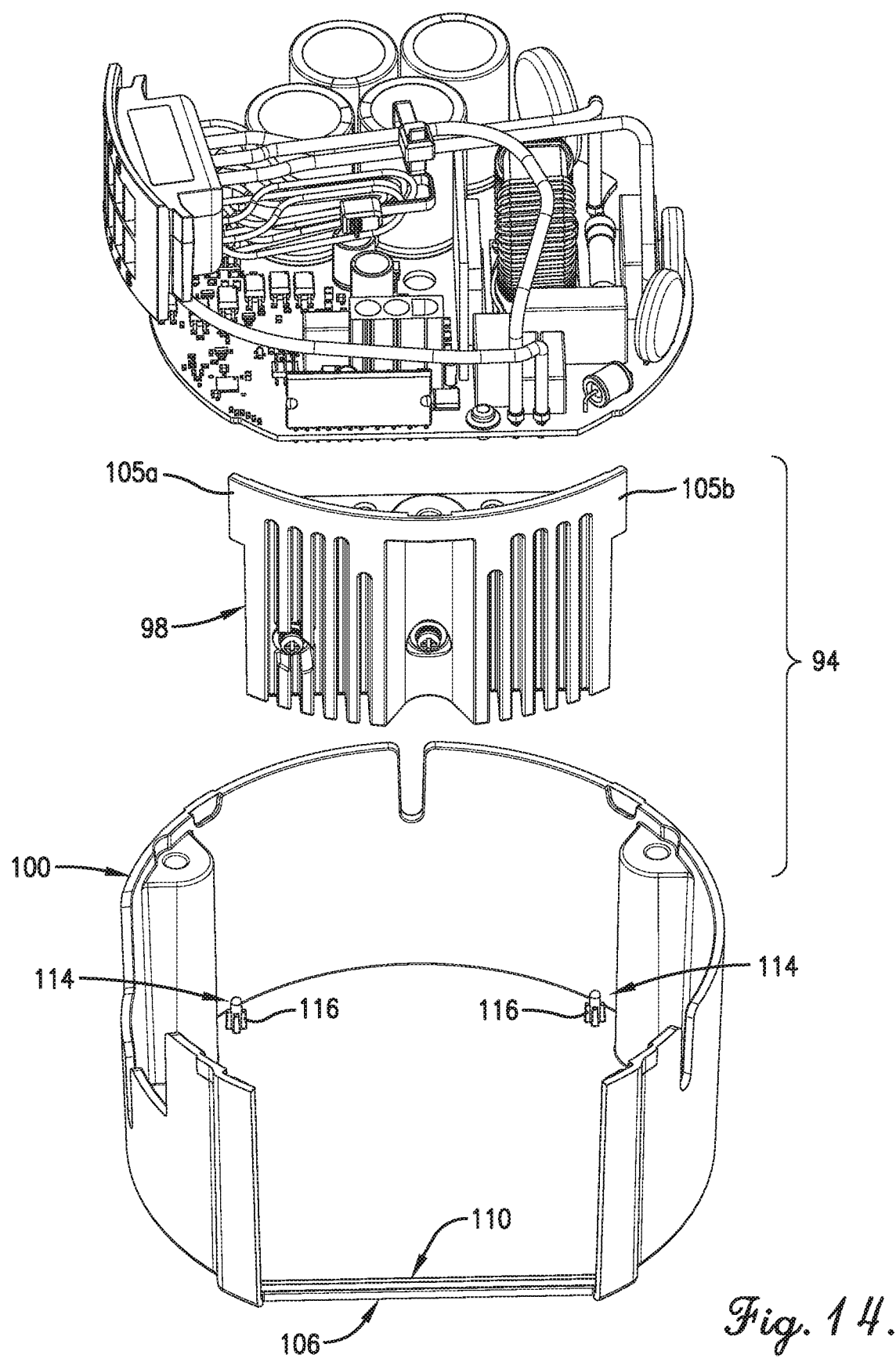
FIG. 14 is a partially exploded side perspective view illustrating aspects and contents of a controller can according to a second embodiment of the present invention.

As illustrated in FIG. 14, the controller can 94 preferably includes a metal insert 98 and can housing 100. The can housing 100 includes two pairs of opposing flanges 104, each pair including an inner flange 104a radially spaced from an outer flange 104b and together defining an axially-extending U- or V-shaped slot therebetween. (See FIG. 15)

The metal insert 98 includes corresponding axially-extending flanges 105a, 105b along arcuately or circumferentially-spaced opposite sides of the metal insert 98. (See FIG. 14)

Each pair of opposing flanges 104 is configured to receive a corresponding one of the flanges 105a, 105b of the metal insert 98 therebetween to at least partly secure the metal insert 98 against radial and/or circumferential movement with respect to the can housing 100. Flanges 104, 105 are respectively analogous to flanges 72 and opposing, arcuately-spaced edges of the metal insert 54 of the first embodiment outlined above.

In an assembled motor, the metal insert 98 is preferably press fit into the slots formed by the flanges 104. In an embodiment, mating of the opposite sides of the metal insert 98 (e.g., the flanges 105) with the can housing 100 also supports sealing of a controller compartment defined inside the controller can 94 from the ambient environment.

The can housing 100 further includes an end plate 106. An exterior surface of the end plate 106 is formed with ribs 108 for enhanced rigidity and structural integrity. An interior surface of the end plate 106 is formed with a substantially U-shaped slot or groove 110. The metal insert 98 further includes a corresponding end flange or tongue 112 extending along a third (axially terminal) side of the metal insert 98 that is substantially transverse to the axially-extending flanges 105a, 105b. The slot 110 is formed immediately adjacent and in a complementary position to the assembled end flange 112.

Assembly of the metal insert 98 to the can housing 100 positions the end flange 112 within and flush along a bottom and/or sidewall of the slot 110 in a tongue-and-groove sealing engagement. (See FIG. 18) One of ordinary skill will appreciate that the sealing may be partial or total, and may help to restrict leakage of water, potting fluid or other fluids from seams between the metal insert 98 and the can housing 100. It is foreseen that embodiments may include one, two, three or more such flange/slot sealing and/or mating interfaces between a metal insert and a can housing without departing from the scope of the present invention.

Turning now to FIGS. 15 and 19, the can housing 100 also includes a second embodiment of short spacers 114 for maintaining spacing between the end plate 106 and the controller. The short spacers 114 include four spokes 116. The spokes 116 are evenly spaced about the periphery of each of the spacers 114, and extend radially outward therefrom. The spokes 116 are configured to engage and support the controller (e.g., a PCB) and maintain pre-determined spacing from the end plate 106. The spokes 116 may be utilized with or in the place of the annular shelf of spacers 90 of the first embodiment discussed above and illustrated in FIG. 11. Spacers 114 and 90 may be molded, cast or otherwise monolithically and/or integrally-formed with the can housing 100 and/or may be attached thereto. Spacers 114 and/or 90 are preferably utilized together with spacer(s) of a metal insert comprising ground mounting pads, discussed in more detail in connection with the first embodiment above.

Although the above description presents features of preferred embodiments of the present invention, other preferred embodiments may also be created in keeping with the principles of the invention. Furthermore, these other preferred embodiments may in some instances be realized through a combination of features compatible for use together despite having been presented independently as part of separate embodiments in the above description.

The preferred forms of the invention described above are to be used as illustration only and should not be utilized in a limiting sense in interpreting the scope of the present invention. Modifications to the exemplary embodiments, as hereinabove set forth, could be readily made by those skilled in the art without departing from the spirit of the present invention.

What is claimed is:

1. An electric motor comprising:
a rotor rotatable about an axis;
a stator; and
a motor housing including a controller can comprising a synthetic can housing and a metal insert thermal conductor,
said synthetic can housing defining a slot,
said metal insert thermal conductor being inserted into the slot,
said metal insert thermal conductor including a surface area exposed to an external heat sink.

2. The electric motor of claim 1,
said metal insert thermal conductor comprising a flange inserted into the slot.

3. The electric motor of claim 2,
said synthetic can housing comprising a pair of radially-spaced flanges including an inner flange and an outer flange cooperatively defining the slot.

4. The electric motor of claim 2,
said synthetic can housing comprising an end plate defining the slot.

5. The electric motor of claim 4,
said insertion of the flange of the metal insert thermal conductor into the slot of the end plate at least partially sealing an interior of the controller can from an ambient environment.

6. The electric motor of claim 1,
further comprising a controller including a printed circuit board,
said synthetic can housing further comprising an end plate and a spacer,
said spacer engaging the printed circuit board and maintaining a pre-determined separation between the printed circuit board and the end plate.

7. The electric motor of claim 6,
said spacer comprising four arcuately spaced spokes engaging the printed circuit board.

8. The electric motor of claim 6,
said spacer being integrally-formed with said end plate.

9. The electric motor of claim 1,
further comprising a controller including a printed circuit board and at least one electronic component,
said metal insert thermal conductor being thermally connected to the controller.

10. The electric motor of claim 1, wherein said can housing comprises a skirt.

11. An electric motor comprising:
a rotor rotatable about an axis;
a stator; and
a motor housing including a controller can comprising a synthetic can housing and a metal insert thermal conductor,
said synthetic can housing defining a slot,
said metal insert thermal conductor being inserted into the slot,
said metal insert thermal conductor comprising a flange inserted into the slot,
said slot being defined adjacent a first side of the metal insert thermal conductor, said synthetic can housing defining a second slot adjacent a second side of the metal insert thermal conductor opposite of the first side, said metal insert thermal conductor comprising a second flange inserted into the second slot, said first and second flanges engaging with respective ones of the first and second slots to restrict circumferential movement of the metal insert thermal conductor with respect to the synthetic can housing.

12. The electric motor of claim 11, said synthetic can housing comprising an end plate defining a third slot, said metal insert thermal conductor comprising a third flange extending along a third side of the metal insert thermal conductor substantially transverse to the first and the second sides, said third flange being inserted into said third slot to partially seal an interior of the controller can from an ambient environment.

13. An electric motor comprising:
a rotor rotatable about an axis;
a stator; and
a motor housing including a controller can comprising a synthetic can housing and a metal insert thermal conductor,
said synthetic can housing defining a slot,
said metal insert thermal conductor being inserted into the slot,
said controller can presenting an exposed surface area facing an external heat sink space,
said metal insert thermal conductor presenting between ten percent (10%) and forty percent (40%) of the exposed surface area.

14. An electric motor comprising:
a rotor rotatable about an axis;
a stator; and
a motor housing including a controller can comprising a synthetic can housing and a metal insert thermal conductor,
said synthetic can housing defining a slot,
said metal insert thermal conductor being inserted into the slot,
said synthetic can housing including an end plate comprising a thermally insulative material,
said metal insert thermal conductor comprising thermally conductive material,
said thermally insulative material having a thermal conductivity at least four (4) times less than a thermal conductivity of the thermally conductive material.

15. The electric motor of claim 14, wherein the thermally conductive material is selected from the group consisting of: aluminum, zinc, copper and combinations thereof.

16. An electric motor comprising:
a rotor rotatable about an axis;
a stator;
a motor housing including a controller can comprising a synthetic can housing and a metal insert thermal conductor, and
a controller including a printed circuit board and at least one electronic component,
said metal insert thermal conductor being thermally connected to the controller,
said synthetic can housing defining a slot,
said metal insert thermal conductor being inserted into the slot,
said synthetic can housing including an end plate,
said printed circuit board being mounted to a spacer at least partly disposed between the printed circuit board and the end plate,
said spacer comprising a ground mounting pad in electrical communication with the metal insert thermal conductor.

17. The electric motor of claim 16, wherein said spacer is integrally formed with the metal insert thermal conductor.

18. An electric motor comprising:
a rotor rotatable about an axis;
a stator; and
a motor housing including a controller can comprising a synthetic can housing and a metal insert thermal conductor,
said synthetic can housing defining a slot,
said metal insert thermal conductor being inserted into the slot,
said metal insert thermal conductor having an outer surface comprising a plurality of heat transfer fins.

19. An electric motor comprising:
a rotor rotatable about an axis;
a stator; and
a motor housing including a controller can comprising a synthetic can housing and a metal insert thermal conductor,
said synthetic can housing defining a slot,
said metal insert thermal conductor being inserted into the slot,
said can housing comprising a skirt, wherein said skirt defines a plurality of arcuately-spaced drainage holes.

20. The electric motor of claim 19, wherein said metal insert thermal conductor is removably fixed relative to the skirt.

* * * * *